(12) United States Patent
Sugimura et al.

(10) Patent No.: US 7,511,605 B2
(45) Date of Patent: Mar. 31, 2009

(54) IC CHIP FOR IDENTIFICATION, DATA-READING METHOD, AND DATA-WRITING METHOD

(75) Inventors: Shiro Sugimura, Kanazawa (JP); Hideki Kobayashi, Kanazawa (JP); Shuhei Taniguchi, Neagari-machi (JP)

(73) Assignees: FEC Co., Ltd., Kanazawa-shi, Ishikawa-ken (JP); The Government of Malaysia, Putrajaya (MY)

( * ) Notice: Subject to any disclaimer, the term of this patent is extended or adjusted under 35 U.S.C. 154(b) by 487 days.

(21) Appl. No.: 10/936,335

(22) Filed: Sep. 8, 2004

(65) Prior Publication Data

US 2005/0056703 A1 Mar. 17, 2005

(30) Foreign Application Priority Data

Sep. 11, 2003 (JP) ............... 2003-319280

(51) Int. Cl.
  *H04Q 5/22* (2006.01)
  *G08C 19/00* (2006.01)

(52) U.S. Cl. ............ 340/10.2; 340/825.62; 340/825.63; 340/825.72; 235/492

(58) Field of Classification Search ............... 340/10.2, 340/825.62, 825.63, 825.64, 825.72; 235/492
See application file for complete search history.

(56) References Cited

U.S. PATENT DOCUMENTS

| | | | |
|---|---|---|---|
| 5,134,277 A | 7/1992 | Yerbury et al. | |
| 5,345,231 A | 9/1994 | Koo et al. | |
| 5,354,979 A | 10/1994 | Adelson et al. | |
| 5,532,686 A * | 7/1996 | Urbas et al. ............... 340/10.51 |
| 5,557,280 A * | 9/1996 | Marsh et al. .................. 342/44 |
| 5,874,724 A | 2/1999 | Cato | |
| 5,874,730 A | 2/1999 | Yi et al. | |
| 6,542,083 B1 * | 4/2003 | Richley et al. ......... 340/825.49 |
| 6,570,490 B1 | 5/2003 | Saitoh et al. | |
| 6,725,014 B1 * | 4/2004 | Voegele ..................... 455/41.2 |
| 2005/0056703 A1 | 3/2005 | Sugimura et al. | |
| 2005/0206504 A1 | 9/2005 | Sugimura et al. | |
| 2006/0103535 A1 | 5/2006 | Pahlaven et al. | |
| 2006/0273902 A1 | 12/2006 | Shafer et al. | |

FOREIGN PATENT DOCUMENTS

| | | |
|---|---|---|
| DE | 41 15 730 | 12/1991 |
| JP | 04287526 | 10/1992 |
| JP | 10145443 | 5/1998 |
| JP | 2000-022659 | 1/2000 |
| JP | 2000022649 | 1/2000 |
| JP | 2003218624 | 7/2002 |
| JP | 2003218624 | 7/2003 |
| WO | WO 88/04453 | 6/1988 |

* cited by examiner

*Primary Examiner*—Brian A Zimmerman
*Assistant Examiner*—Nam V Nguyen
(74) *Attorney, Agent, or Firm*—J. Harold Nissen; Lackenbach Siegel, LLP

(57) ABSTRACT

Restrictions on the frequency of a carrier signal are removed. This invention comprises a power section for receiving the carrier signal and creating an internal voltage, a clock-generating section for creating an internal clock based on a clock pulse that is carried by the carrier signal, a memory section, a writing section for storing data that is carried on an optical signal in the memory section, and an output section for reading the data in the memory and load-modulating the carrier signal.

13 Claims, 4 Drawing Sheets

IC CHIP FOR IDENTIFICATION, DATA-READING METHOD, AND DATA-WRITING METHOD

BACKGROUND OF THE INVENTION

1. Field of the Invention

This invention relates to an IC chip for wireless identification that is used for identifying various types of objects, persons, and the like, and to methods for reading and writing data from/to the IC chip.

This application is based on Japanese Patent Application No. 2003-319280, the contents of which are incorporated herein by reference.

2. Description of the Related Art

Many kinds of IC cards and IC tags have been developed, and they are widely used for identifying various types of objects, persons, and the like. IC cards and IC tags may be contacting or non-contacting, but the non-contacting type that incorporates an IC chip for wireless identification is superior, since it is more convenient to use. In addition to incorporating the wireless IC chip in an IC card or an IC tag, it may be incorporated directly in various types of objects, including paper money and the like, and used in identifying them.

A conventional wireless IC chip for identification supplies electrical power by using carrier waves from the outside (e.g. see Japanese Unexamined Patent Publication No. 10-145443). That is, when carrier waves from an external reader/writer are received via an on-chip antenna, they are rectified to create an internal power source, so that data that has been superimposed on the carrier waves can be read, and the required data can be transmitted by radio.

According to the conventional art, carrier waves from the outside are used not only in creating an internal power source for the IC chip but also as carrier waves for carrying data; one problem is that, in order to accurately demodulate the superimposed data, the carrier wave frequency must be kept constant, which tends to limit the range of application. That is, since the characteristics of the on-chip antenna mounted on the IC chip are affected by the properties of the item that incorporates the IC chip, fixing the carrier wave frequency makes it necessary to adapt the characteristics of the on-chip antenna to each individual item.

SUMMARY OF THE INVENTION

Accordingly, it is an object of this invention to solve these problems of the conventional art by using carrier waves that carry only a clock pulse, and thereby provide an IC chip for identification that essentially has no restrictions on the frequency of the carrier waves, and has an extremely wide range of application, and methods for reading and writing data from/to the IC chip.

In order to achieve the above objects, a first aspect of this invention comprises a power section that creates an internal voltage by using a carrier wave from the outside; a clock-generating section that creates an internal clock based on a clock pulse, which is carried on the carrier wave; a memory section; and an output section that serially reads data in the memory section in compliance with the internal clock, and load-modulates the carrier wave.

It is possible to provide a writing section that serially reads data carried by an optical signal from the outside in compliance with an internal clock, and stores it in the memory section; the writing section detects data overflow, and blocks writing to the memory section accordingly.

The clock-generating section can distinguish the clock pulse that is carried by the carrier wave, and a bump for connecting an outside antenna can be fitted to an on-chip antenna that connects to the output section.

A second aspect of this invention comprises the steps of creating an internal clock based on a clock pulse, which is carried on a carrier wave from the outside, and serially reading data stored in a memory section in compliance with the internal clock, and load-modulating the carrier wave.

A third aspect of this invention comprises the steps of creating an internal clock based on a clock pulse, which is carried on a carrier wave from the outside, serially storing data, which is carried on an optical signal from the outside, and writing the stored data in a memory section, and in addition, blocking writing to the memory section.

According to the constitution of the first aspect, the power section creates the internal voltage by using the carrier wave from the outside, and the clock-generating section creates an internal clock based on a clock pulse, which is carried on the carrier wave. The output section serially reads data stored in the memory section in compliance with the internal clock from the clock-generating section, and load-modulates the carrier wave. Accordingly, an outside reader that transmits the carrier wave is able to read the data from the memory section via the carrier wave; at this time, neither the IC chip for identification nor the reader have any dependency on the frequency of the carrier wave. In other words, the carrier wave is merely a wave for carrying the clock pulse, supplying power for the internal voltage, and there are essentially no restrictions on its frequency.

The writing section serially reads the data carrier on the optical signal from the outside, and stores it in the memory section, thereby enabling the desired data to be written and stored in the memory section. At this time, the optical signal data is in synchronism with the clock pulse carried by the carrier wave. This is because the clock pulse is a base for the internal clock, and defines the reference time when reading the data of the optical signal.

The writing section detects overflow of data carried on the optical signal and blocks writing to the memory section accordingly, thereby prohibiting any subsequent additional writing so as to prevent any change in the data of the memory section. The memory section may be rendered non-writable by using hardware to block and close a gate circuit, which is provided before the shift register that reads the data from the optical signal; alternatively, a nonvolatile fuse memory may be used in the memory section, this fuse memory being blocked and rendered non-writable by using the hardware; a combination of both of the above may be used. When using hardware to block the gate circuit, it is acceptable to use, for example, a rewritable flash memory as the nonvolatile memory of the memory section.

The clock-generating section can increase noise tolerance by distinguishing the clock pulse carried on the carrier wave. This is because noise waves are not mistakenly identified as carrier waves. For example, the clock pulse can be distinguished by using a bandpass filter having a narrow band that only extracts clock pulse frequency elements.

When an on-chip antenna is fitted with a bump for connecting an outside antenna, the characteristics of the on-chip antenna can be easily improved via the outside antenna, increasing the communication distance of the IC chip for identification and thereby greatly enlarging the range of its application.

The second aspect realizes the operations of the clock-generating section, the memory section, and the output section of the first aspect, and the third aspect realizes the operations of the clock-generating section, the memory section, and the writing section of the first aspect.

DESCRIPTION OF THE PREFERRED EMBODIMENTS

Preferred embodiments of the invention will be explained with reference to the diagrams.

Figure 1:
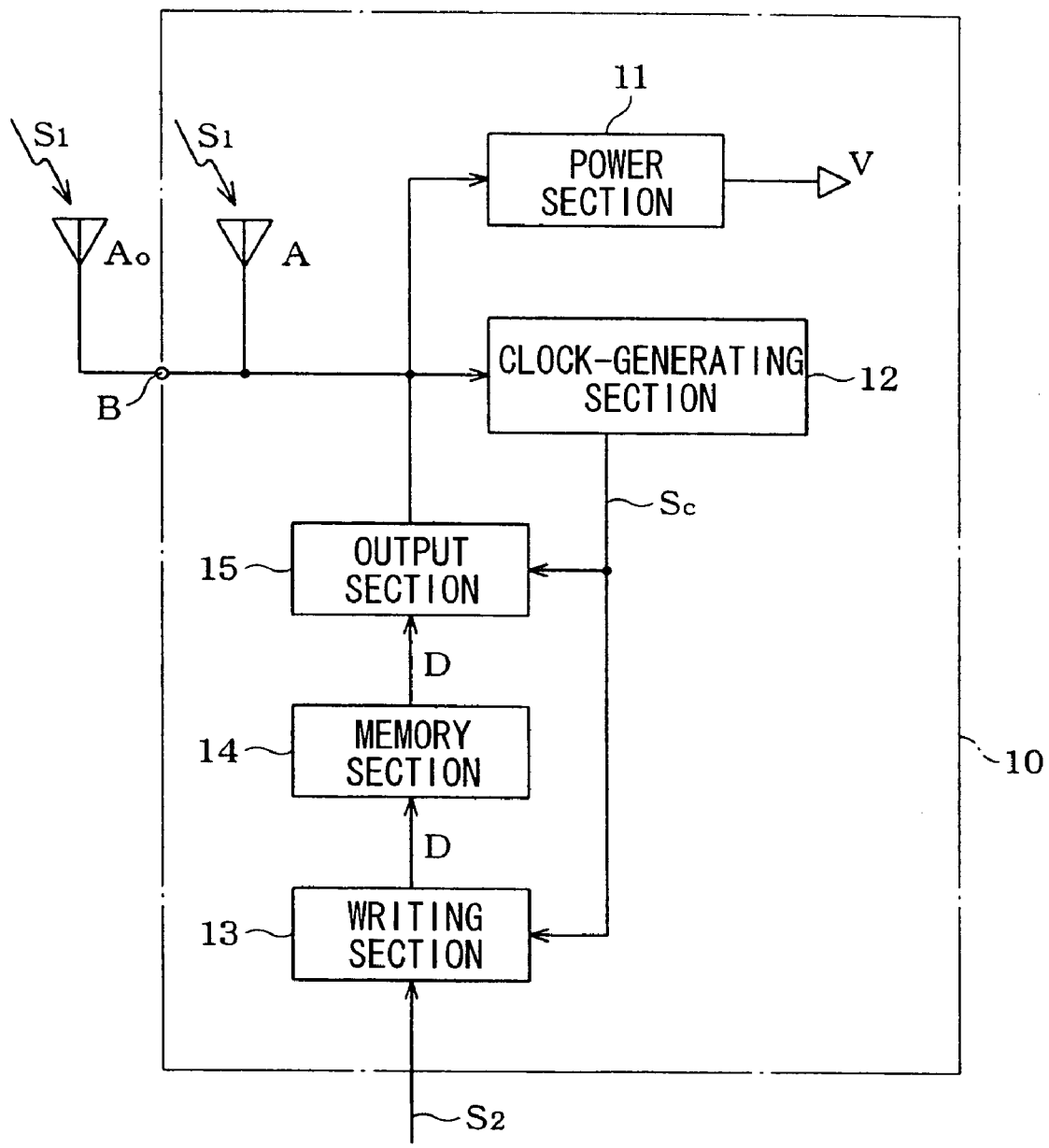
FIG. 1 is a block diagram showing an overall constitution.

An IC chip for identification 10 uses a wireless system, and comprises a power section 11, a clock-generating section 12, a writing section 13, a memory section 14, and an output section 15 (FIG. 1).

The input sides of the power section 11 and the clock-generating section 12, and the output side of the output section 15 are connected in common to an on-chip antenna A. The on-chip antenna A is fitted with a bump B for connecting an outside antenna Ao. Carrier waves S1 reach the on-chip antenna A and the outside antenna Ao from unillustrated outside readers.

The output of the power section 11 is supplied as an internal voltage V to the internal parts of the IC chip 10. The output of the clock-generating section 12 is split to the writing section 13 and the output section 15 as an internal clock Sc, and the writing section 13 outputs via the memory section 14 to the output section 15. An optical signal S2 reaches the writing section 13 from an unillustrated outside writer.

Figure 2:
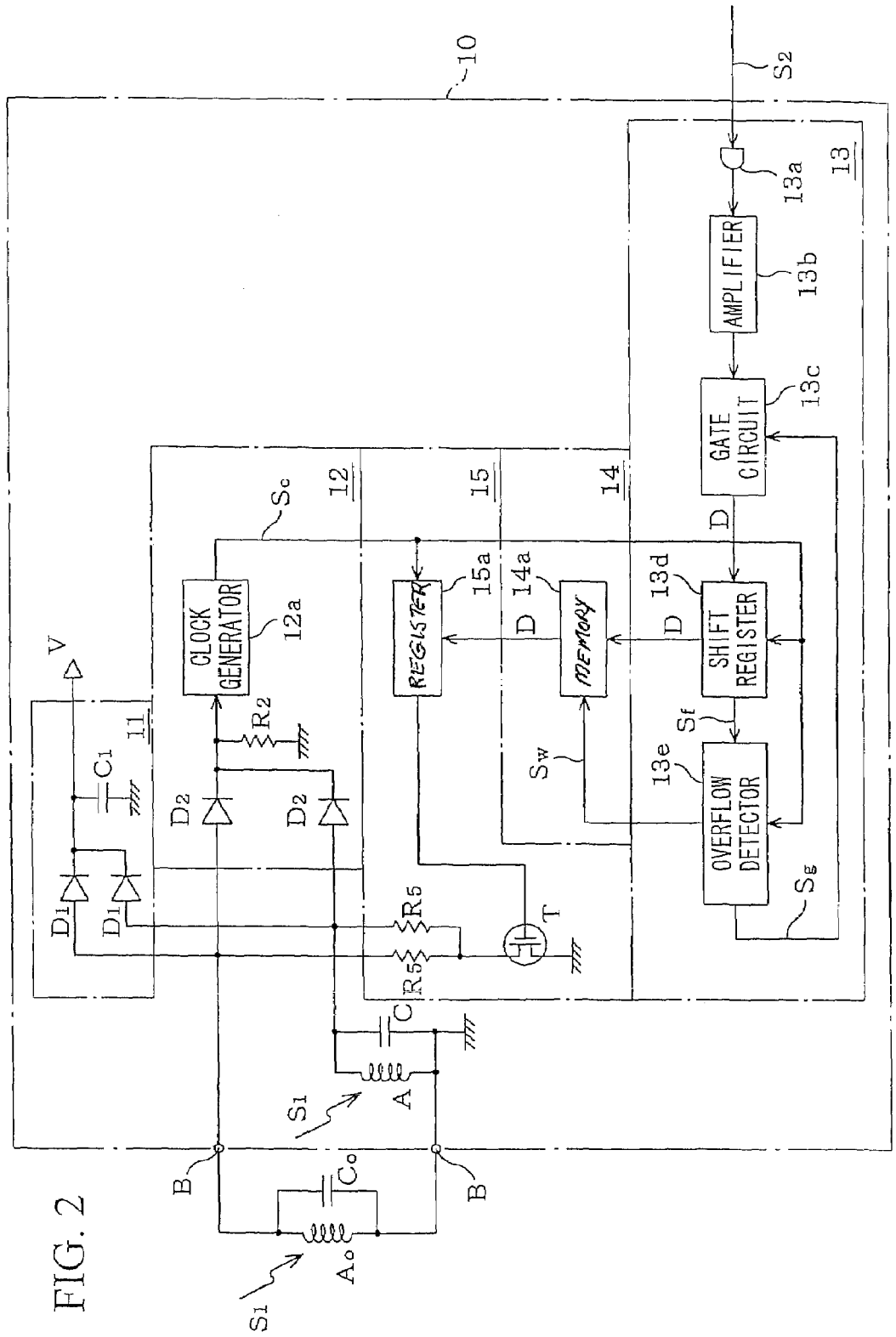
FIG. 2 is a detailed block diagram.

A capacitor for resonance C is connected in parallel to the on-chip antenna A (FIG. 2), and one end of the on-chip antenna A connects to ground. Incidentally, the outside antenna Ao can be appended to the on-chip antenna A via connecting bumps B, with a capacitor for resonance Co being connected in parallel to the outside antenna Ao. However, ends of the non-grounded sides of the on-chip antenna A and the outside antenna Ao lead separately to the power section 11, the clock generator 12, and the output section 15.

In the power section 11, ends of the non-grounded sides of the on-chip antenna A and the outside antenna Ao are connected in common via rectifying diodes D1. A smoothing capacitor C1 connects to the output side of the diodes D1 and D1, and outputs the internal voltage V.

In the clock generator section 12, ends of the non-grounded sides of the on-chip antenna A and the outside antenna Ao are connected in common via detecting diodes D2 and D2, and lead to a clock generator 12a. The input side of the clock generator 12a is grounded via a resistance R2, and the output of the clock generator 12a is led as an internal clock Sc to a shift register 13d in the writing section 13, an overflow detector 13e, and a register 15a in the output section 15.

The writing section 13 is comprised by concatenating an amplifier 13b, a gate circuit 13c, the shift register 13d, and the overflow detector 13e in sequence to a light-receiving element 13a that receives the optical signal S2 from the outside writer. The output of the overflow detector 13e is separately connected to a memory 14a of the memory section 14, in addition to the gate circuit 13c. The light-receiving element 13a comprises, for example, a photodiode.

Another output of the shift register 13d is connected to the memory 14a of the memory section 14, and the output of the memory 14a connects to the register 15a of the output section 15. The output of the register 15a is connected to the gate of a switching element T, such as, for example, an FET; the cathode side of the switching element T is grounded, and the anode side is connected via separate resistances R5 and R5 to the ends of the on-chip antenna A and the outside antenna Ao.

Figure 3A:
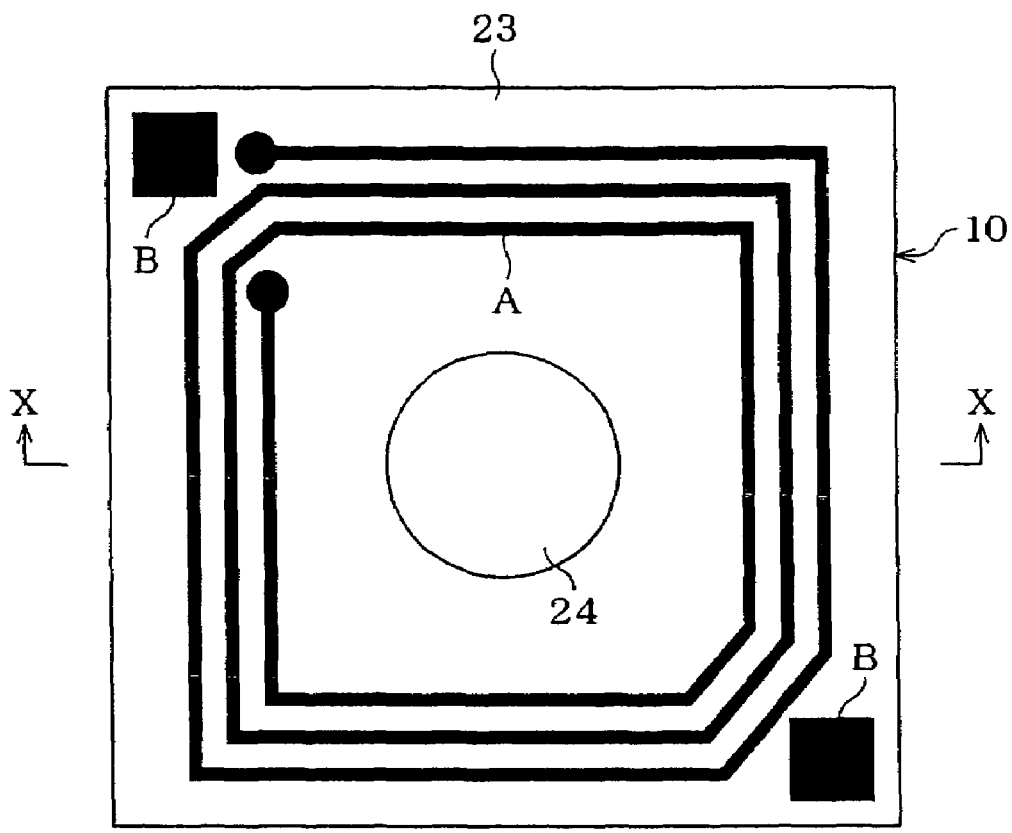
FIGS. 3A and 3B are schematic diagrams showing an overall constitution.
Figure 3B:
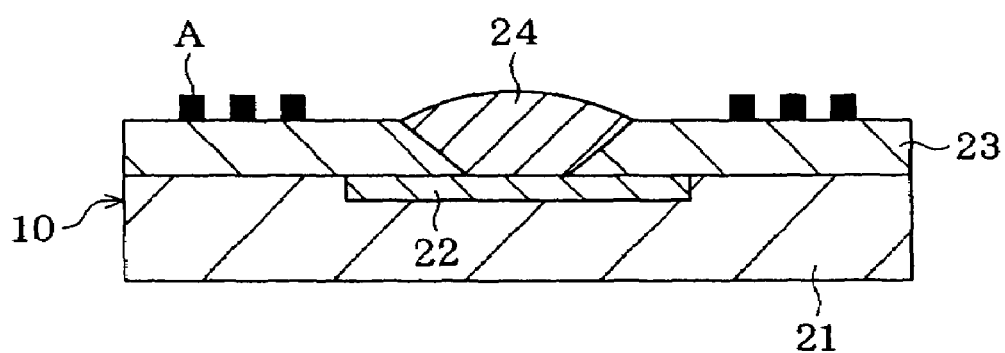

The IC chip 10 may, for example, be formed as a 0.5 mm square silicon chip (FIG. 3). FIG. 3B is a cross-sectional view taken along the arrowed line X-X of FIG. 3A.

The IC chip 10 is made by forming a required integrated circuit 22 on a silicon base 21, providing an insulating layer 23 of, for example, polymide, over the top face of the silicon base 21, and thereafter forming the on-chip antenna A and the bumps B on the insulating layer 23. The on-chip antenna A illustrated here is a triple-wind loop antenna that is suitable for use at a frequency of 2.45 GHz, which is a representative frequency of the carrier wave S1, and has a metal-plated layer formed on the insulating layer 23. Furthermore, a convex lens-shaped light-permeable section is provided in one part of the insulating layer 23 in order to efficiently deliver the optical signal S2 to the light-receiving element 13a in the integrated circuit 22.

The operation of the IC chip 10 is as follows.

Figure 4:
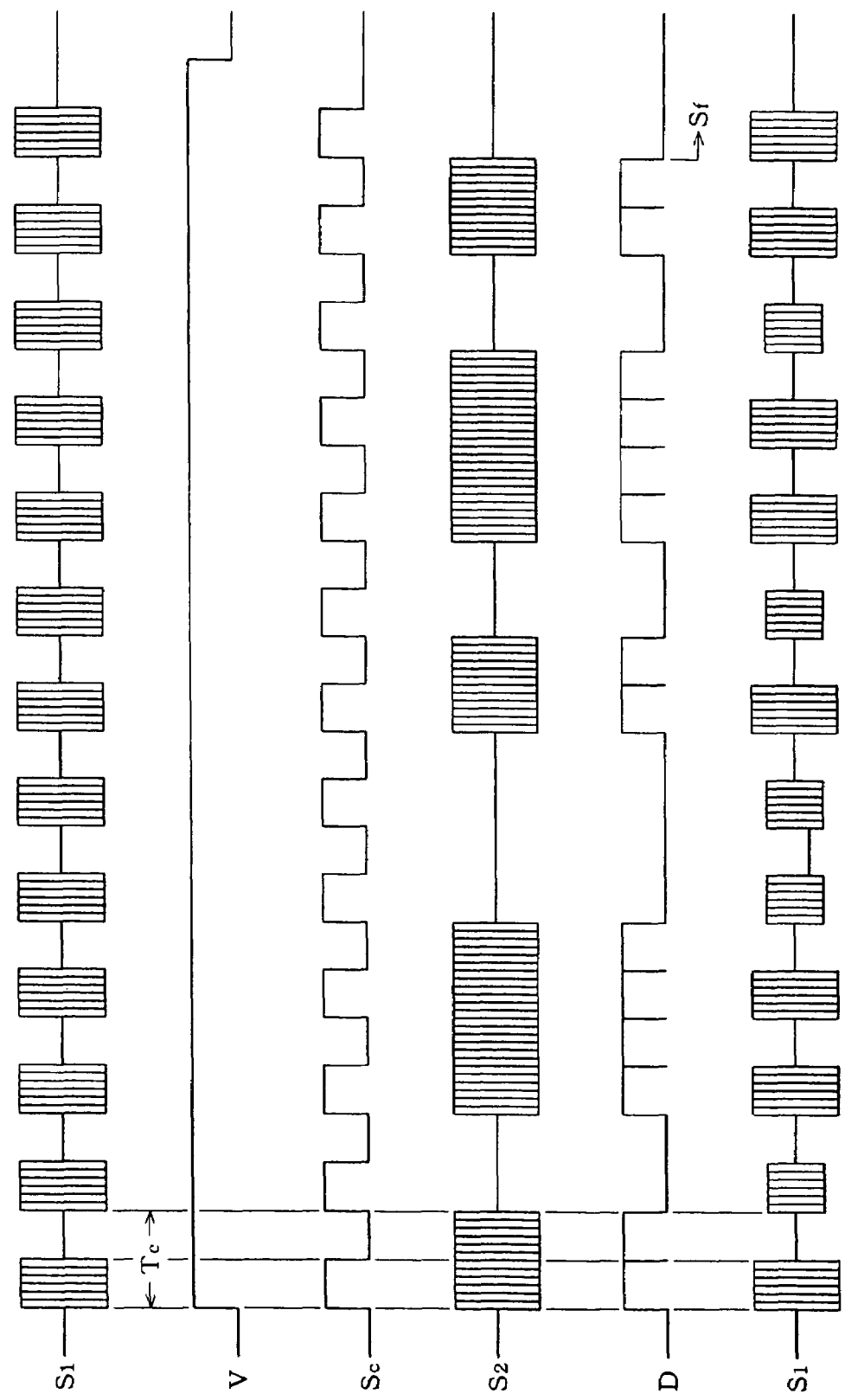
FIG. 4 is an operational diagram.

When no data is written in the memory 14a of the memory section 14, the carrier signal S1 that carries the clock pulse is transmitted from the outside reader to the on-chip antenna A and/or the outside antenna Ao (topmost level of FIG. 4), enabling the power section 11 to rectify the carrier signal S1 by using the diodes D1 and D1, and create the internal voltage V (FIG. 4). The carrier signal S1 has a frequency of approximately 10 MHz to 70 GHz, and, for example, a clock pulse at a clock frequency $fc=1/Tc=100$ KHz (where Tc is the clock pulse cycle) is superimposed by 100% ASK modulation. Instead of ASK modulation, the clock pulse may be superimposed by FSK modulation, PSK modulation, or the like. The clock generator 12a of the clock-generating section 12 can detect the carrier signal S1 via the diodes D2 and D2, and create an internal clock Sc based on the clock pulse that is carried by the carrier signal S1.

Next, the optical signal S2 that carries the data D is led into the light-receiving element 13a from the outside writer. The optical signal S2 should preferably be an infrared beam at an auxiliary carrying frequency of 500 KHz or more, and the data D to be superimposed on the optical signal S2 is synchronized with the clock pulse carried by the carrier signal S1. The data D is stored in the shift register 13d, being read serially via the gate circuit 13c into the shift register 13d in compliance with the internal clock Sc. This is because the shift register 13d operates in compliance with the internal clock Sc.

When a predetermined amount of data D has been stored, the shift register 13d, generates an overflow signal Sf. Accordingly, the overflow detector 13e transmits a write signal Sw to the memory 14a of the memory section 14, writes and stores the data D in the shift register 13d into the memory 14a, and, in addition, transmits a gate signal Sg to the gate circuit 13c, and closes the gate circuit 13c, making it possible to block the passage of data D after closing the gate circuit 13c. That is, the memory 14a of the memory section 14 is blocked to prevent writing thereto via the gate circuit 13c. Incidentally, the memory 14a is a nonvolatile memory, which holds its internal data D and stands by, even when the carrier signal S1 from the outside has vanished and the internal voltage V has been lost.

When the carrier signal S1 from the outside once again reaches the on-chip antenna A and the outside antenna Ao, the register 15a of the output section 15 serially reads the data D in the memory 14a in compliance with the internal clock Sc, and opens or closes the switching element T in compliance with the data D. The switching element T fluctuates the load impedance of the on-chip antenna A and the outside antenna Ao via the resistances R5 and R5, load-modulating the carrier signal S1 in compliance with the data D (lowermost level of FIG. 4). The reader that transmits the carrier signal S1 is then able to read the data D in the memory 14a.

In the preceding explanation, the outside antenna Ao need only be used when necessary. When using only the on-chip antenna A, the frequency of the carrier signal S1 is limited to one near the resonance frequency of the on-chip antenna A; at this time, the reader is configured so as to sweep the frequency of the carrier signal S1 and write or read data D at the optimum frequency.

A clock pulse distinguishing function can be incorporated into the clock generator 12a of the clock-generating section 12. An internal clock Sc is created only for a clock pulse at a specific clock frequency fc, which is superimposed on the carrier signal S1, thereby enabling noise tolerance to be increased. When superimposing the clock pulse on the carrier signal S1 by ASK modulation, the degree of modulation of the carrier signal S1 can be set freely within a range of 10% to 100%, but should preferably between set to the smallest degree of modulation that will obtain the desired noise tolerance. This is so as to reduce the capacity of the smoothing capacitor C1 of the power section 11.

The gate circuit 13c should, for example, incorporate a fuse that is blown by the gate signal Sg, the gate circuit 13c being closed by hardware after the fuse has blown so as not to reopen. Since the memory 14a is securely blocked via the gate circuit 13c at this time, it may acceptably comprise a rewriteable flash memory. However, the memory 14a should preferably be a non-rewriteable flash memory, fuse memory, or the like, to ensure that the data D being stored are not altered.

What is claimed is:

1. An IC chip for identification, comprising:
   a power section that creates an internal voltage by using a carrier wave from the outside;
   a clock-generating section that extracts a clock pulse from the carrier wave on which the clock pulse is superimposed, thereby allowing the extracted clock pulse to perform as an internal clock;
   a memory section;
   a writing section that receives an optical signal in compliance with the clock pulse from the carrier wave on which data is superimposed from the outside, the writing section serially extracts the data from the optical signal in synchronization with the internal clock, and the writing section further stores the data in the memory section; and
   an output section that serially reads the data in the memory section in synchronization with the internal clock, and load-modulates the carrier wave.

2. The IC chip for identification as described in claim 1, wherein the writing section detects data overflow and blocks writing to the memory section accordingly solely in response to the data overflow.

3. The IC chip for identification as described in claim 2, wherein the clock-generating section is coupled directly to the carrier wave from outside distinguishes the clock pulse that is carried by the carrier wave.

4. The IC chip for identification as described in claim 2, further comprising a bump for connecting an outside antenna, the bump being fitted to an on-chip antenna that connects to the output section.

5. The IC chip for identification as described in claim 1, further comprising a bump for connecting an outside antenna, the bump being fitted to an on-chip antenna that connects to the output section.

6. The IC chip for identification as described in claim 1, wherein the carrier wave is a carrier wave which only carries a clock pulse.

7. The IC chip for identification as described in claim 1, wherein the frequency of the carrier wave is free of any restrictions.

8. The IC chip for identification as described in claim 1, wherein an outside reader that transmits the carrier wave is able to read the data from the memory section via the carrier wave with the IC chip and the outside reader having no dependency on the carrier wave.

9. A method for writing and reading data in an IC chip for identification, the method comprising:
   creating an internal voltage by using a carrier wave from the outside;
   extracting a clock pulse from the carrier wave on which the clock pulse is superimposed, thereby allowing the extracted clock pulse to perform as an internal clock;
   receiving an optical signal in compliance with the clock pulse extracted from the carrier wave on which data is superimposed from the outside;
   further storing the data in a memory section;
   serially reading the data in the memory section in synchronization with the internal clock; and
   load-modulating the carrier wave.

10. The method for writing and reading data in an IC chip for identification as described in claim 9, further comprising:
    detecting data-overflow and blocking writing to the memory section accordingly solely in response to the data overflow.

11. The method for writing and reading data in an IC chip for identification as described in claim 9, wherein the carrier wave used is a carrier wave which only carrier a clock pulse.

12. The method for writing and reading data in an IC chip for identification as described in claim 9, wherein the frequency of carrier wave has no restrictions on its frequency.

13. The method for writing and reading data in an IC chip for identification as described in claim 9, wherein an outside reader transmits the carrier wave and is able to read the data from the memory section via the carrier wave with the IC chip and the outside reader having no dependency on the carrier wave.

* * * * *

UNITED STATES PATENT AND TRADEMARK OFFICE
CERTIFICATE OF CORRECTION

PATENT NO. : 7,511,605 B2  Page 1 of 1
APPLICATION NO. : 10/936335
DATED : March 31, 2009
INVENTOR(S) : Shiro Sugimura, H. Kobayasyhi and S. Taniguchi It is certified that error appears in the above-identified patent and that said Letters Patent is hereby corrected as shown below:

Title page, item [73] the address for the first assignee, FEC Co., Ltd. is listed as: 141, Higashi, Utsugi-machi, Kanazawa-shi, Ishikawa-ken, JAPAN and it should be: 1414, Higashi, Utsugi-machi, Kanazawa-shi, Ishikawa-ken, JAPAN.

Signed and Sealed this

Twelfth Day of May, 2009

JOHN DOLL
*Acting Director of the United States Patent and Trademark Office*